US 9,318,141 B2

(12) United States Patent  
Katano

(10) Patent No.: US 9,318,141 B2  
(45) Date of Patent: Apr. 19, 2016

(54) RECORDING MEDIUM

(71) Applicant: FUJI ELECTRIC CO., LTD., Kawasaki-shi (JP)

(72) Inventor: Tomonori Katano, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 0 days.

(21) Appl. No.: 14/372,452

(22) PCT Filed: Feb. 28, 2013

(86) PCT No.: PCT/JP2013/001255  
§ 371 (c)(1),  
(2) Date: Jul. 16, 2014

(87) PCT Pub. No.: WO2013/168324  
PCT Pub. Date: Nov. 14, 2013

(65) Prior Publication Data  
US 2015/0010781 A1    Jan. 8, 2015

(30) Foreign Application Priority Data  
May 7, 2012  (JP) .................................. 2012-105972

(51) Int. Cl.  
G11B 5/66    (2006.01)  
G11B 5/725  (2006.01)  
G11B 5/72    (2006.01)

(52) U.S. Cl.  
CPC . *G11B 5/725* (2013.01); *G11B 5/72* (2013.01)

(58) Field of Classification Search  
None  
See application file for complete search history.

(56) References Cited

U.S. PATENT DOCUMENTS

| | | | | |
|---|---|---|---|---|
| 4,647,494 A | * | 3/1987 | Meyerson et al. | 428/216 |
| 6,322,880 B1 | * | 11/2001 | Chen | 428/216 |
| 7,147,943 B2 | * | 12/2006 | Ono et al. | 428/835 |
| 2006/0021966 A1 | * | 2/2006 | Hattori et al. | 216/41 |
| 2007/0243417 A1 | | 10/2007 | Murakami et al. | |
| 2008/0187781 A1 | * | 8/2008 | Cheng et al. | 428/812 |
| 2009/0316289 A1 | * | 12/2009 | Okura | 360/59 |
| 2010/0129686 A1 | * | 5/2010 | Furuta et al. | 428/846 |
| 2013/0034746 A1 | * | 2/2013 | Katano et al. | 428/833.2 |

FOREIGN PATENT DOCUMENTS

| | | |
|---|---|---|
| JP | H09-138943 A | 5/1997 |
| JP | 2001-331972 A | 11/2001 |
| JP | 2006-277779 A | 10/2006 |
| JP | 2008-192288 A | 8/2008 |
| JP | 2010-003359 A | 1/2010 |
| JP | 2010-153012 A | 7/2010 |
| WO | WO-2005/083696 A1 | 9/2005 |

* cited by examiner

*Primary Examiner* — Holly Rickman  
(74) *Attorney, Agent, or Firm* — Rabin & Berdo, P.C.

(57) ABSTRACT

A recording medium includes a magnetic recording layer formed on a substrate; a protective layer formed on the magnetic recording layer and having a total thickness that is equal to or greater than 1 nm but equal to or less than 2 nm. The protective layer is composed of a silicon oxide layer formed on the magnetic recording layer and having a thickness of 0.3 nm or more; a silicon layer formed on the silicon oxide layer and having a thickness of 0.2 nm or more; and an amorphous carbon layer formed on the silicon layer and having a thickness of 0.2 nm or more, and having a hydrogen content equal to or greater than 25.6 at % but equal to or less than 43.3 at %. Thus, magnetic spacing between the magnetic recording layer and a magnetic head advantageously may be reduced while maintaining the thermal insulation characteristics.

1 Claim, 2 Drawing Sheets

RECORDING MEDIUM

BACKGROUND OF THE INVENTION

1. Field of the Invention

The present invention relates to a recording medium, and preferably to a magnetic recording medium that is used in an information recording device, especially a hard disk device, mounted in information processing apparatuses such as computers or consumer appliances.

2. Background of the Related Art

The amount of information handled by computers and other types of information processing apparatuses has recently been increasing but the information processing apparatuses continue to become smaller and smaller. In view of such circumstances, due to an attempt to increase the recording capacities of the information recording apparatuses, the recording capacities that are required by the recording media of the information recording apparatuses have been increasing.

In order to increase the recording volumes of recording media and at the same time improve the recording performances thereof, the magnetic spacing, which is the distance between the read/write element of the magnetic head and the magnetic recording layer of a recording medium, needs to be reduced as much as possible. The magnetic spacing is determined based on the thickness of the protective layer of the magnetic head, the flight height of the magnetic head, and the thicknesses of the protective layer and lubricating layer of the recording medium. Therefore, reducing the thickness of the protective layer of the recording medium is considered one of the development challenges of the recording medium. Amorphous carbon called DLC (Diamond Like Carbon) is generally employed in the protective layer of the recording medium.

While practicing reduction of the magnetic spacing as described above, on the other hand, a heat-assisted magnetic recording system has been proposed as new technology for achieving a high recording density of a magnetic recording layer of a recording medium and development activity is underway to be put to practical use. In the heat-assisted magnetic recording system, a magnetic material of high coercivity that can withstand thermal fluctuations is applied to the magnetic recording layer. In order to write information, a laser beam is radiated from the magnetic head to record information, with temporarily lowered coercivity of the magnetic recording layer.

FIG. 1 is a schematic cross-sectional diagram of a recording medium formed using a conventional heat-assisted magnetic recording system. In FIG. 1, a recording medium 1 is configured with a substrate 2, a magnetic recording layer 3, a protective layer 4, and a lubricating layer 5. The substrate 2 is formed from a glass material or an aluminum material with a plated surface and functions as a base material. The magnetic recording layer 3 is a layer in which information is read/written by a magnetic head (not shown). When applying the heat-assisted magnetic recording system, the magnetic recording layer 3 is formed by, for example, sputtering a metallic material such as FePt. The protective layer 4 is a material that is formed on the magnetic recording layer 3 to protect the magnetic recording layer 3 from damage, such as corrosion, abrasion, and impact. The protective layer 4 is generally formed from DLC by means of a sputtering method, plasma CVD (Chemical Vapor Deposition), or the like. The lubricating layer 5 is a layer for covering the surface of the protective layer 4. The lubricating layer 5 is generally formed into a thickness of approximately 1 nm by means of a dipping method or the like using PFPE (perfluoropolyether).

The recording density of the conventional recording medium 1 is approximately 500 Gbits/in$^2$, and the thickness of the protective layer 4 is 2 to 3 nm. The thickness of the protective layer 4 needs to be set at 2 nm or less in order to increase the recording density of the recording medium 1 to 750 Gbits/in$^2$ or more. The thickness of the protective layer 4 needs to be set at 1 nm in order to increase the recording density of the recording medium 1 to 2000 Gbits/in$^2$.

In the heat-assisted magnetic recording system, the temperature of the magnetic recording layer 3 is increased to, for example, 300° C. to 400° C. by laser radiation. The protective layer 4 and the lubricating layer 5 are exposed to the heat as well, which brings about concerns involving decomposition or dissipation of particularly the lubricating layer 5. Replacing the protective layer 4 and the lubricating layer 5 with materials of high thermal resistance would be one of the ideas. Unfortunately, it is extremely difficult to develop the materials that bring together the inherent characteristics of the protective layer 4 and the lubricating layer 5, such as lubricity, corrosion protective properties, and impact protective properties. For this reason, an idea proposed is to introduce an insulating layer between the magnetic recording layer 3 and the protective layer 4 to alleviate the impact of heat without significantly changing the materials of the protective layer 4 and the lubricating layer 5.

Japanese Patent Application Publication No. 2010-153012 (Patent Document 1) describes that the reliability of the carbon protective layer and of the lubricating layer can be ensured by interposing an insulating layer made of a material of low thermal conductivity, such as $SiO_2$, $TiO_2$, or $ZrO_2$, between the magnetic recording layer and the carbon protective layer, to relax the flow of heat generated from the magnetic recording layer. Patent Document 1 has a structure in which a new insulating layer is provided in addition to the carbon protective layer. If the thickness of the carbon protective layer is reduced by the thickness of the newly interposed insulating layer in order to keep the original magnetic spacing that is obtained when only the carbon protective layer is used, the functions of the carbon protective layer, such as corrosion resistance, sliding durability, and head flyability, become deteriorated. This is because the insulting layer is not originally designed to function as a protective layer. Therefore, with the additional thickness of the insulating layer to the thickness of the carbon protective layer to keep the properties of the carbon protective layer, it is difficult to keep the thickness of the entire protective layer at 2.0 nm or less.

Japanese Patent Application Publication No. 2010-3359 (Patent Document 2) describes that the protective layer is configured by a plurality of layers and that the insulation effect can be obtained due to the interface thermal resistance of the protective layer. However, normally a low-density initial growth layer with many structural defects exists in the vicinity of the interface between the layers. The initial growth layer, therefore, has a greater portion of the protective layer configured by a plurality of layers, which inevitably results in an increase of the film thickness in order to obtain the same levels of corrosion resistance, sliding durability, and head flyability.

Japanese Patent Application Publication No. H9-138943 (Patent Document 3) describes that the magnetic spacing can be reduced by reducing the thickness of the protective layer without taking thermal insulation into consideration. Patent Document 3 adopts a two-layer structure of Si/a-C, wherein the Si film has the effect of reducing the initial growth layers in the carbon film (paragraphs 0014 to 0016). Patent Document 3, however, does not mention how to ensure thermal insulation applicable to the heat-assisted magnetic recording system, and therefore does not take thermal resistance into consideration. Thus, an insulating layer needs to be newly employed to the structure, inevitably increasing the magnetic spacing accordingly.

The present invention was contrived in view of the problems described above, and one of a plurality of objects of the present invention is to reduce the thickness of the protective layer thereof to 2.0 nm or less while keeping thermal insulation.

SUMMARY OF THE INVENTION

One aspect of a recording medium according to the present invention is a recording medium for reading/writing information by using a head implementing reading/writing on the basis of magnetic principles, the recording medium having: a substrate; a magnetic recording layer formed on the substrate; a protective layer formed on the magnetic recording layer; and a lubricant layer formed on the protective layer, wherein the protective layer is configured with a silicon oxide layer formed on the magnetic recording layer, a silicon layer formed on the silicon oxide layer, and an amorphous carbon layer formed on the silicon layer, the silicon oxide layer has a thickness of 0.3 nm or more, the silicon layer has a thickness of 0.2 nm or more, the amorphous carbon layer has a thickness of 0.2 nm or more, a total thickness of the protective layer is equal to or greater than 1 nm but equal to or less than 2 nm, and the amorphous carbon layer has a hydrogen content equal to or greater than 25.6 at % but equal to or less than 43.3 at %.

The present invention can provide a recording medium that has a thin protective layer and ensures corrosion resistance, sliding durability, and head flyability without increasing the magnetic spacing. For example, the present invention can provide a recording medium corresponding to a recording density of 750 to 2000 Gbit/in$^2$ at a region where the total thickness of the protective film is 2.0 nm or less.

DETAILED DESCRIPTION OF THE INVENTION

Figure 1:
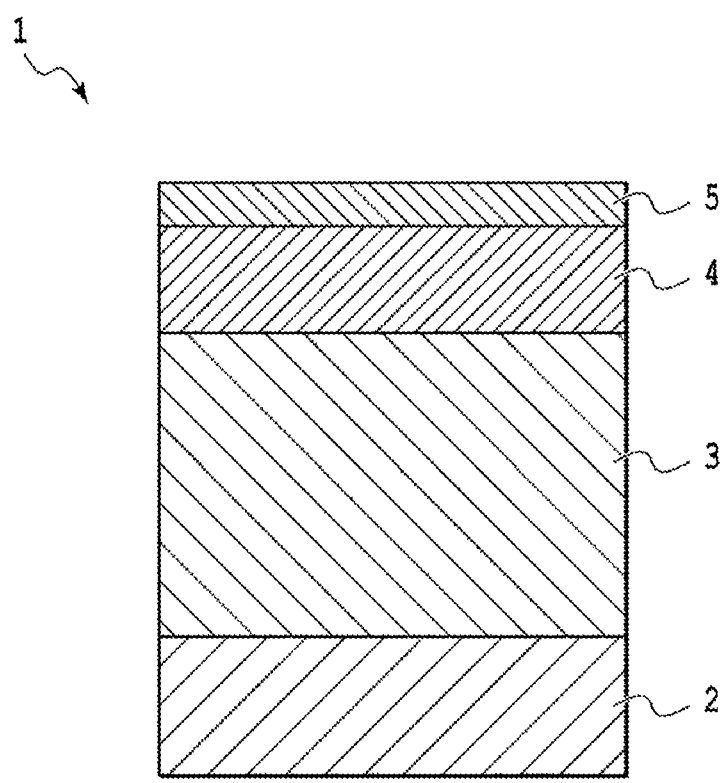
FIG. 1 is a schematic cross-sectional diagram illustrating a layer configuration of a conventional recording medium.
Figure 2:
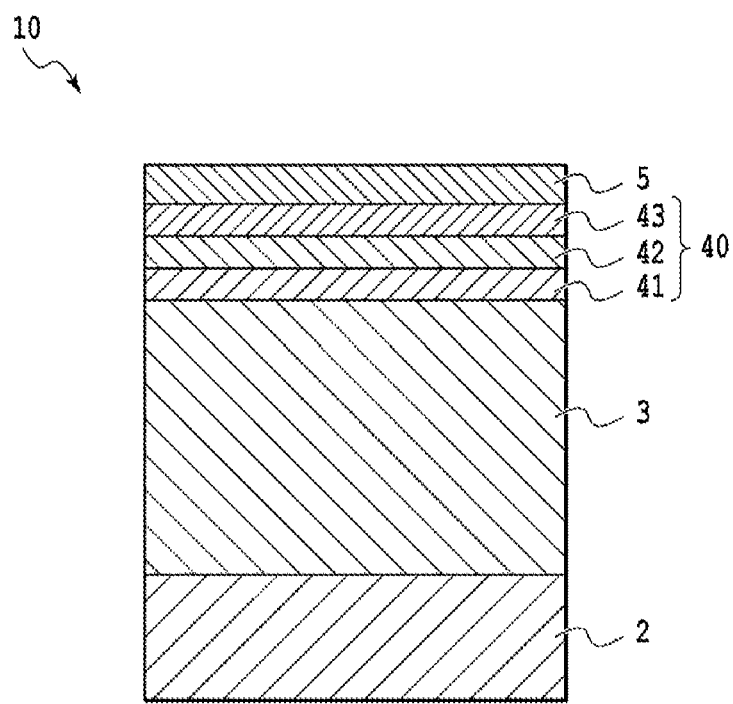
FIG. 2 is a schematic cross-sectional diagram illustrating an example of a layer configuration of a recording medium according to the present invention.

An embodiment for implementing the present invention is now described hereinafter with reference to FIG. 2. FIG. 2 is a schematic cross-sectional diagram illustrating an example of a layer configuration of a recording medium 10. The recording medium 10 is configured with a substrate 2, a magnetic recording layer 3, a protective layer 40, and a lubricating layer 5. The substrate 2, the magnetic recording layer 3, and the lubricating layer 5 can be configured using the same materials and production methods as those of the prior arts.

The protective layer 40 is a layer formed on the magnetic recording layer 3 to protect the magnetic recording layer 3 from damage such as corrosion, abrasion, and impact. The protective layer 40 is configured with a silicon oxide layer (first layer) 41, a silicon layer (second layer) 42 formed on the first layer 41, and an amorphous carbon layer (third layer) 43 formed on the second layer 42.

The silicon oxide layer 41 is formed through a sputtering method or a CVD method using silane gas as an ingredient. Due to its low thermal conductivity and large interface resistance, silicon oxide is expected to exert an excellent insulation effect. The thickness of the silicon oxide layer 41 is 0.3 nm or more, and a thickness less than 0.3 nm cannot satisfy the thermal resistance of the layer.

The silicon layer 42 is formed through a sputtering method or a CVD method using silane gas or silicon chloride gas as an ingredient. The thickness of the silicon layer 42 is 0.2 nm or more, and a thickness less than 0.2 nm cannot improve the density of the amorphous carbon layer and therefore cannot satisfy the corrosion resistance, head flyability, and sliding durability of the amorphous carbon layer.

The amorphous carbon layer 43 is formed through a plasma CVD method using hydrocarbon gas such as ethylene or acetylene or liquid hydrocarbon such as xylene, toluene, or benzene as an ingredient, so as to be able to introduce hydrogen into the amorphous carbon layer 43. The plasma source applied here can be selected from a parallel plane method, an ICP (inductively coupled plasma) method, an ECR (electron cyclotron resonance) method, an ECWR (electron cyclotron wave resonance) method and the like, depending on the intended use. The thickness of the amorphous carbon layer 43 is 0.2 nm or more, and a thickness less than 0.2 nm impairs the structure of the layer and therefore cannot bring about the inherent characteristics of carbon, such as head flyability and sliding durability.

The thickness of the protective layer 40 is equal to or greater than 1 nm but equal to or less than 2.0 nm. If the thickness is less than 1 nm, corrosion resistance cannot be realized, but if the thickness exceeds 2.0 nm, a recording density of 750 Gbits/in$^2$ or higher cannot be obtained.

The silicon oxide layer 41, the silicon layer 42, and the amorphous carbon layer 43 can include other elements in addition to silicon oxide, silicon, and amorphous carbon, respectively. For example, the amorphous carbon layer contains hydrogen in the present invention.

The hydrogen content of the amorphous carbon layer 43 is equal to or greater than 25.6 at % but equal to or less than 43.3 at %. A hydrogen content less than 25.6 at % cannot enhance the corrosion resistance of the layer, but a hydrogen content exceeding 43.3 at % cannot obtain desired corrosion resistance because the carbon layer begins to resemble a polymer structure, impairing the characteristics of carbon.

Normally, a protective layer configured by a plurality of layers needs to be thicker than a protective layer configured by a single layer. In a combined structure with an amorphous carbon layer and a silicon layer underneath the amorphous carbon layer, however, carbon grows tracing the structure of the silicon material which has sp$^3$ bonding. Consequently, the sp$^3$ bonding property of the carbon, hence the density of the carbon, improves from the beginning of growth. Moreover, in the case of an amorphous carbon layer with a thickness of 1.5 nm or less, in particular, it is preferred that such an amorphous carbon film be formed by introducing a moderate amount of hydrogen (equal to or greater than 25.6 at % but equal to or less than 43.3 at %) thereto at low energy, in stead of eliminating the hydrogen to harden the film. This is because migration of the carbon particles on the silicon layer surface leads to formation of an amorphous carbon layer that has no pinholes and improved coverage and corrosion resistance, resulting in formation of an amorphous carbon layer that is thinner than a protective layer configured by a single layer.

Silicon oxide is excellent in terms of thermal insulation and has high corrosion resistance due to its stable structure with less defects. Furthermore, because the lattice spacing of silicon oxide is substantially equal to that of silicon, silicon can be grown on the silicon oxide layer, without having much impact of an initial growth layer. In other words, an underlayer with a combination of silicon oxide and silicon can stand comparison with an underlayer of the same thickness made of a silicon material alone, and can bring about an equal level of corrosion resistance, sliding durability, and head flyability by being combined with the amorphous carbon layer.

The combination of the silicon oxide layer, the silicon layer, and the amorphous carbon layer as in the present invention can make the protective layer thinner than an amorphous carbon layer configured by a single layer, and can reduce the magnetic spacing, while maximizing the thermal insulation, as described above. In other words, the inventor of the present invention has found that, instead of stacking the amorphous carbon layer on a silicon layer configured by a single layer, stacking the amorphous carbon layer, the silicon layer, and the silicon oxide layer that has low thermal conductivity, excellent thermal insulation, and excellent affinity to silicon, can make the protective layer thin and can reduce the magnetic spacing, while keeping thermal insulation.

EXAMPLES

An evaluation method is now described first, followed by specific examples and the effects thereof.

In order to perform a film thickness evaluation, the film thickness was obtained from the number of photoelectrons generated, which was obtained through XPS (X-ray Photoelectron Spectroscopy), after calibration with a film thickness measured beforehand by a cross-sectional TEM (Transmission Electron Microscopy) technique. The amount of hydrogen contained in the amorphous carbon layer was calculated by means of simulation fitting by detecting the recoil hydrogen ions, resulting from the bombardment of $N_2^+$ ions, by an ERDA (Elastic Recoil Detection Analysis) technique.

As the characteristic evaluation items, corrosion resistance, sliding durability, and head flyability of the recording medium were evaluated. Nitric acid solution with 3% concentration was dropped onto the surface of the protective layer, which was left for an hour and then recovered, and the amount of Co to be eluted was measured using an ICP-MS (Inductively Coupled Plasma Mass Spectrometer), which was then divided by the area where the nitric acid solution was dropped. The corrosion resistance was evaluated based on the resultant value. In terms of the evaluation on the corrosion resistance, "good" (pass) means that the elution amount is 0.1 $ng/cm^2$ or less, which is low enough not to cause any problems in a reliability test of the recording medium in a hard disk device, and "poor" (fail) means that the elution amount exceeds that level. In order to evaluate the sliding durability, an alumna titanium carbide ball with 2 mm diameter was pressed against and rolled on the surface of the recording medium with a load of 30 gf, to measure the lubricity between the ball and the surface as changes in frictional force. If the lubricity is not impaired up to 300 sliding durability tests required for ensuring reliability, the result of the evaluation is considered "good," but if the frictional force drastically increases, thereby impairing the lubricity, the result of the evaluation is considered "poor." In order to evaluate the head flyability, the head, contact of which with respect to the recording medium is measured by means of a piezoelectric element, was caused to float on the surface of the recording medium, and the head flyability thereof was measured based on the maximum output voltage value of the piezoelectric element. The voltage value required for ensuring the reliability is 150 mV, and if the result of the evaluation is equal to or lower than that value, it is considered "good," but if the voltage value exceeds that level, the result of the evaluation is considered "poor." In order to evaluate the thermal resistance, the laser-irradiated section was analyzed by means of a TOF-SIMS (Time-of-flight secondary ion mass spectrometer). The amount of fragment peaks deriving from the lubricant main chain was compared and if there remains at least 95% compared to the value prior to the irradiation, the result of the evaluation is considered "good," but if there remains less than 95%, the result of the evaluation is considered "poor." Samples were fabricated varying the thicknesses of the first to third layers and the amount of hydrogen contained in the third layer, and the evaluation results were obtained as shown in Table 1. The thicknesses of each layer were varied by adjusting the film formation time and hydrogen content was adjusted by varying the RF output to obtain the samples.

TABLE 1

| | First Table Table showing evaluation results of each sample | | | | | | | | |
|---|---|---|---|---|---|---|---|---|---|
| Sample No. | Silicon Oxide Layer Thickness/ nm (a) | Silicon Layer Thickness/ nm (b) | Carbon Layer Thickness/ nm (c) | Protective Layer Thickness/ nm (a) + (b) + (c) | Hydrogen Content (at %) | Corrosion Resistance | Head Flyability | Sliding Durability | Thermal Resistance |
| 1 | 0.3 | 0.5 | 0.3 | 1.1 | 18.0 | Poor | | | |
| 2 | 0.6 | 0.5 | 0.8 | 1.9 | 22.9 | Poor | | | |
| 3 | 0.8 | 0.3 | 0.7 | 1.8 | 15.1 | Poor | | | |
| 4 | 0.3 | 0.8 | 0.1 | 1.2 | 25.9 | Good | Poor | Poor | Good |
| 5 | 0.4 | 0.2 | 0.1 | 0.7 | 35.2 | Good | Poor | Poor | Good |
| 6 | 0.8 | 0.3 | 0.1 | 1.2 | 40.5 | Good | Poor | Poor | Good |
| 7 | 0.1 | 0.9 | 0.2 | 1.2 | 40.4 | Good | Good | Good | Poor |
| 8 | 0.2 | 1.1 | 0.2 | 1.5 | 27.9 | Good | Good | Good | Poor |
| 9 | 0.3 | 0.1 | 0.6 | 1.0 | 41.6 | Poor | Poor | Poor | Good |
| 10 | 0.3 | 0.1 | 1.2 | 1.6 | 45.4 | Poor | Poor | Poor | Good |
| 11 | 0.3 | 0.8 | 0.9 | 2.0 | 25.6 | Good | Good | Good | Good |
| 12 | 0.5 | 0.2 | 0.7 | 1.4 | 27.5 | Good | Good | Good | Good |
| 13 | 0.6 | 0.4 | 0.2 | 1.2 | 29.0 | Good | Good | Good | Good |
| 14 | 0.4 | 0.2 | 0.4 | 1.0 | 43.3 | Good | Good | Good | Good |
| 15 | 0.4 | 0.3 | 0.2 | 0.9 | 34.7 | Poor | Good | Good | Good |
| 16 | 0.7 | 0.5 | 0.5 | 1.7 | 47.1 | Poor | | | |
| 17 | 0.3 | 0.4 | 0.8 | 1.5 | 55.2 | Poor | | | |

Example

A magnetic recording layer, configured with a granular layer containing FePt, was formed on a 2.5-inch glass substrate by means of a sputtering method. The first layer was formed thereon as a silicon oxide layer, by means of a sputtering method using argon gas, and subsequently the second layer was formed thereon as a silicon layer by means of a sputtering method using argon gas. Thereafter, the third layer, or the amorphous carbon layer, was formed thereon by means of an ECWR plasma source using ethylene as an ingredient, with an output of 190 to 1050 W and pressure of 0.09 to 0.35 Pa. Thereafter, a PFPE lubricating layer was formed into a thickness of 1 nm on the amorphous carbon layer by means of a dipping method, completing samples 11 to 14. All of these samples passed the criteria of corrosion resistance, sliding durability, head flyability and thermal resistance, as shown in the first table. Specifically, it was found that all evaluation items were satisfied when the protective layer was configured under the conditions that the hydrogen content is equal to or greater than 25.6 at % but equal to or less than 43.3 at %, the thickness of the silicon oxide layer is 0.3 nm or more, the thickness of the silicon layer is 0.2 nm or more, the thickness of the amorphous carbon layer is 0.2 nm or more, and the total thickness of the protective layer, i.e., the silicon oxide layer, the silicon layer, and the amorphous carbon layer, is 1.0 nm or more, as shown in the first table.

Comparative Example 1

After the first layer and the second layer were formed in the same manner as in the example, the third layer, or the amorphous carbon layer, with reduced hydrogen content was formed by means of an ECWR plasma source using ethylene as an ingredient, with an output of 3000 to 4000 W and pressure of 0.02 Pa. A PFPE lubricating layer was formed into a thickness of 1 nm on this third layer by means of a dipping method, completing samples 1 to 3 shown in the first table. The corrosion resistance of each of these samples was evaluated, but none of them passed the criterion. The corrosion resistance of each sample did not improve when the film was hardened with a reduced hydrogen content (i.e., less than 25.6 at %), in so far as the case when the amorphous carbon layers were thin and an impact of the initial growth layers was large. Instead, the conditions described in the example in which a moderate amount of hydrogen (i.e., equal to or greater than 25.6 at % but equal to or less than 43.3 at %) is introduced into the amorphous carbon layer at relatively low energy, were more advantageous in terms of the corrosion resistance. This is considered due to migration of the carbon particles deposited on the silicon layer, forming no pinholes and improving the coverage of the amorphous carbon layer.

Comparative Example 2

After the first layer and the second layer were formed in the same manner as in the example, the third layer, or the amorphous carbon layer, was formed into a thickness less than 0.2 nm. The film forming conditions were the same as those of the example. Thereafter, a PFPE lubricating layer was formed to a thickness of 1 nm on this third layer by means of a dipping method, completing samples 4 to 6 shown in the first table. As a result of evaluation, the corrosion resistance and thermal resistance of these samples passed the criteria, but the head flyability and sliding durability did not pass the criteria. This is considered to be because the layer structure was impaired when each amorphous carbon layer was thin, i.e., less than 0.2 nm, and consequently the inherent characteristics of carbon, such as the head flyability and sliding durability, did not function properly.

Comparative Example 3

The first layer, or the silicon oxide layer, was formed to a thickness of 0.1 nm or 0.2 nm under the same conditions as those described in the example, and thereafter the second layer and the third layer were formed under the same conditions as those described in the example. Subsequently, a PFPE lubricating layer was formed to a thickness of 1 nm on the third layer by means of a dipping method, completing samples 7 and 8 shown in the first table. As a result of evaluation, the corrosion resistance, head flyability, and sliding durability of these samples passed the criteria, but the thermal resistance did not pass the criterion. This is considered to be because the thermal resistance was not satisfied when the layer of silicon oxide in charge of thermal resistance is less than 0.3 nm.

Comparative Example 4

The first layer was formed under the same conditions as those described in the example, and then the second layer, or the silicon layer, was formed to less than 0.2 nm. Subsequently, the third layer was formed under the same conditions as those described in the example. Thereafter, a PFPE lubricating layer was formed to a thickness of 1 nm on the third layer by means of a dipping method, completing samples 9 and 10 shown in the first table. As a result of evaluation, the thermal resistance of these samples passed the criterion, but the corrosion resistance, head flyability, and sliding durability did not pass the criteria. This is considered to be because the number of defects was increased when the thickness of the silicon layer was less than 0.2 nm and accordingly the $sp^3$ bonding property or density of the amorphous carbon did not improve. Consequently the inherent characteristics of the carbon layer were not obtained.

Comparative Example 5

The first layer, the second layer, and the third layer were formed under the same conditions as those described in the example, wherein the total thickness of the first layer, the second layer and the third layer, which is the thickness of the entire protective layer, was less than 1.0 nm, completing sample 15 shown in the first table. As a result of evaluation, the corrosion resistance of the sample did not pass the criterion. This is presumably because, when the total film thickness was reduced to a certain range or lower, the whole corrosion resistance of the film became insufficient since each layer contributed to corrosion resistance to some degree, depending on its thickness.

Comparative Example 6

The first layer and the second layer were formed under the same conditions as those described in the example, and thereafter the third layer, or the amorphous carbon layer, with increased hydrogen content was formed by means of an ECWR plasma source using ethylene as an ingredient. Subsequently, a PFPE lubricating layer was formed to a thickness of 1 nm on the third layer by means of a dipping method, completing samples 16 and 17 shown in the first table. As a result of evaluation, the corrosion resistance of each sample did not pass the criterion. This is considered to be because the carbon layer begins to resemble a polymer structure when the hydrogen content is high (exceeding 43.3 at %), impairing the inherent characteristics of carbon.

The invention claimed is:

1. A recording medium for reading/writing information by using a head implementing reading/writing on the basis of magnetic principles, the recording medium, comprising:
  (a) a substrate;
  (b) a magnetic recording layer formed on the substrate;
  (c) a protective layer formed on the magnetic recording layer and having a total thickness that is equal to or greater than 1 nm but equal to or less than 2 nm, and being comprised of:
    (i) a silicon oxide layer formed on the magnetic recording layer and having a thickness of 0.3 nm or more;
    (ii) a silicon layer consisting of silicon formed on the silicon oxide layer and having a thickness of 0.2 nm or more; and
    (iii) an amorphous carbon layer formed on the silicon layer and having a thickness of 0.2 nm or more, and having a hydrogen content equal to or greater than 25.6 at % but equal to or less than 43.3 at %; and
  (d) a lubricant layer formed on the protective layer.

* * * * *